May 1, 1928.  1,668,365

C. I. HALL

SELF STARTING SYNCHRONOUS MOTOR

Filed Feb. 5, 1925

Inventor:
Chester I. Hall,
by *Alexander F. Lowe*
His Attorney.

Patented May 1, 1928.

1,668,365

UNITED STATES PATENT OFFICE.

CHESTER I. HALL, OF FORT WAYNE, INDIANA, ASSIGNOR TO GENERAL ELECTRIC COMPANY, A CORPORATION OF NEW YORK.

SELF-STARTING SYNCHRONOUS MOTOR.

Application filed February 5, 1925. Serial No. 7,179.

My invention relates to alternating current motors and in particular to an induction disc type alternating current motor having true synchronous characteristics.

The induction disc type alternating current motor due to its simple construction, fair efficiency, high starting torque, and adaptability to various speeds, fills a wide and extensive field of usefulness. In many instances it becomes desirable to employ a small alternating motor having constant or synchronous speed. Such characteristics are not inherent in the induction disc motor heretofore used although efforts have been made to eliminate temperature, voltage, and frequency speed errors in this type of motor. See for example, my United States Letters Patent Nos. 1,234,465, 1,234,466 and 1,386,861. The methods described in these patents have improved the constant speed characteristics of this type of motor but have not given it true synchronous characteristics. The constantly increasing demand for higher accuracy as regards constant speed operation under unusual conditions of temperature and voltage for certain classes of work such as timing devices for demand meters, calls for additional improvements in the type of motor. Also, the constantly increasing accuracy with which frequency is being maintained on commercial alternating current systems and the use of such systems as synchronous timing systems makes it less important to correct for frequency errors, and more important, to make the speed dependent upon frequency.

According to my invention, I retain the simplicity of construction of the induction disc type motor and convert it into a motor having true synchronous speed characteristics by providing the induction disc with magnetizable sections so spaced as to lock the disk in a synchronous speed relation with the alternating flux cutting the disc at some speed below that where the induction motor torque becomes nil.

Figure 1:
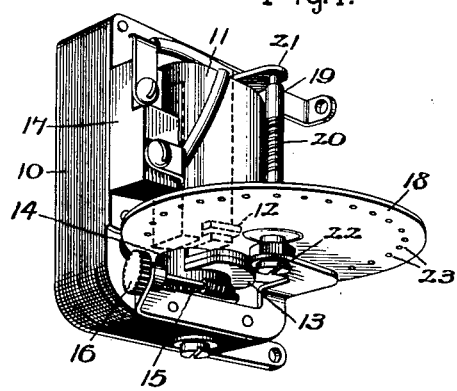
Figure 2:
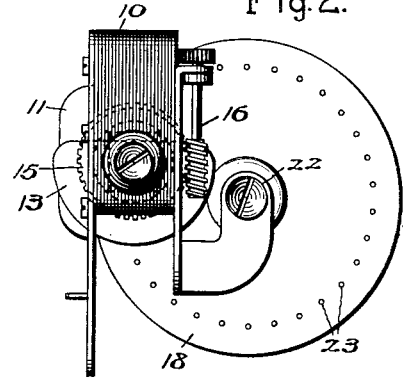
Figure 9:
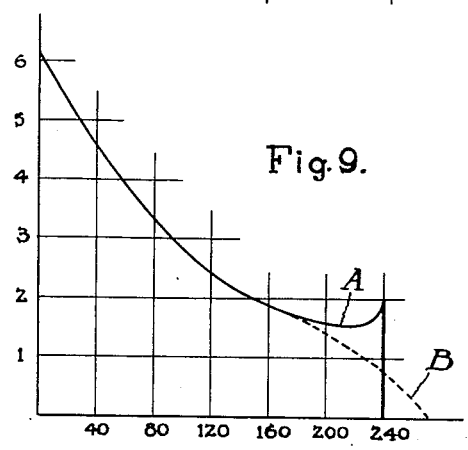

The features of my invention which are believed to be novel and patentable will be pointed out in the claims appended hereto. For a better understanding of my invention, reference is made in the following description to the accompanying drawing in which Fig. 1 represents a perspective view of a motor built in accordance with my invention; Fig. 2 is a bottom view of the motor; Figs. 3 to 8 inclusive represents flux and armature conditions in the air gap for six consecutive parts of a cycle at synchronous speed; and Fig. 9 represents a speed torque curve representative of my improved motor.

Referring now to Figs. 1 and 2, the field or stationary part of the motor is of a well known construction and comprises in this instance the laminated magnetic circuit 10, the field coil 11 and the shading coils 12 and 13 on either side of the air gap. The lower shading coil and the portion 14 of the magnetic circuit on which this shading coil is mounted may be adjustable such as by means of a worm wheel 15 and an adjusting worm screw 16. The terminals of the coil 11 are brought out to a suitable binding post block of insulating material 17. The disc armature 18 is secured to a shaft 19 having a worm 20 or other suitable means for transmitting rotative movement to a load, not shown. The shaft is rotatably supported in suitable bearings 21 and 22, which bearings are supported in the framework of the motor field.

The rotor disc is made of conducting material such as copper or aluminum. The latter is preferable because it decreases the inertia of the rotor and assures rapid acceleration when starting. The rotor disc is inserted in the shifting field air gap of the field magnet in the usual way and so far as the induction motor action is concerned, there is nothing unusual about the motor. The disc is provided with a number of small soft iron pins 23 evenly spaced and extending through the disc adjacent the periphery thereof. In the present instance there are 30 of these pins and they pass through the air gap of the motor when the disc is rotated.

The operation of the motor is as follows: When the coil is energized by an alternating current, an alternating current flux crosses the air gap and cuts the disc. The shading coils produce a shifting of the flux and this shifting flux sets up eddy currents in the disc which in turn react against the flux and produce rotation in a well known manner. The motor starts and quickly comes up to a speed where the pins 23 in passing through the air gap take positions of minimum reluctance in synchronism with the shifting alternating flux. At this speed there is a definite reaction effect due to the magnetic pins which lock the disc in synchronism with the flux within the torque limits of the motor. This reaction motor torque is added to the induction motor torque when a load is applied tending to slow the motor below this speed, and the reaction motor torque is sufficiently in excess of the induction motor torque so that it holds the disc from rotating above this speed. Because of these two distinct torque characteristics, the induction torque and the reaction torque, the motor is appropriately termed an induction, reaction motor.

This reaction effect may be made clearer from a consideration of Figs. 3 to 8 inclusive which represent six consecutive flux and rotor conditions in the air gap during a complete cycle at synchronous speed.

Figure 3:
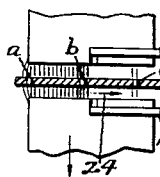

In the present case I have represented a disc having 30 magnetic pins 32. In the present case the magnetic circuit adjacent the air gap has such peripheral dimensions with respect to the disc as to include an average of three pins within the air gap at any instant. In Fig. 3, 12 and 13 represent the shading coils adjacent the air gap. The direction of movement of the disc 18 will then be to the right as represented by the arrow 24.

At the beginning of a cycle, the flux will be forced through the left half of the pole across the air gap and through the disc as represented, due to the lagging effect of the shading coils. The pins in the air gap in Figs. 3 to 8 have been lettered $a$, $b$ and $c$ for the sake of identification. It will be seen that in Fig. 3 the pins occupy such a position as to reduce the reluctance across the air gap to a minimum. They are in a position to intercept the maximum number of lines of force cutting the disc.

Figure 4:
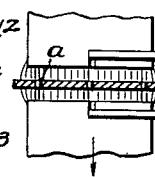

Fig. 4 represents the flux condition after the flux has distributed itself evenly over the pole face, that in the right side increasing and that in the left side decreasing. The pins have moved to the right to again take the position of least reluctance.

Figure 5:
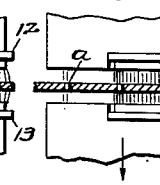

In Fig. 5, which represents the last portion of the cycle when the flux starts to decrease but is retarded in the right side of the pole by the shading coils, the pins have again shifted to the right to occupy a position of least reluctance, pins $b$ and $c$ now being in the strongest part of the field.

Figure 6:
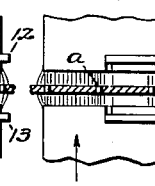

In Fig. 6 the flux has started to reverse and is strongest in the left side of the pole as in Fig. 3. The pins have again shifted to the right and occupy a minimum reluctance position corresponding to Fig. 3, but pin $a$ has been shifted the space of one pin during the half cycle and a new pin now occupies the position which pin $a$ had in Fig. 3.

Figures 7, 8:
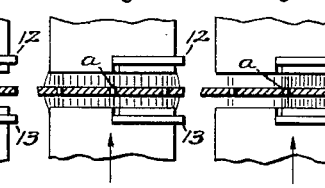

Figs. 7 and 8 correspond to Figs. 4 and 5 with the flux reversed, the pins shifting to the right to maintain the air gap reluctance at a minimum. The next consecutive condition would be similar to that shown in Fig. 3 with pin $a$ shifted to the position there occupied by pin $c$. It will thus be seen that with a 30 pin disc arranged as above described, the disc will rotate 1/15 of a revolution per cycle, or on a 60 cycle circuit will rotate at a true synchronous speed of 240 R. P. M.

The speed torque curve of such a motor is represented by the full line curve A in Fig. 9. The dotted line curve B represents the speed torque curve which would be obtained by a similar motor having an ordinary disc without the pins. From this it will be seen that the reaction motor torque available is approximately equal to the induction motor torque at synchronous speed and since the motor must overcome friction, it cannot increase above this speed since if it attempts to do so, the reaction torque reverses and opposes the induction motor torque. It will also be noted that the motor operates at a speed where the induction motor action is at high efficiency.

It will be appreciated that the placing of iron in a polar relation in the disc produces a locking tendency at stand still which locking tendency varies with the stationary position of the disc, that is to say the locking tendency is more pronounced in certain positions of the rotor than in others. The fairly uniform distribution of the iron, and the small amount of iron used in the construction which I have employed prevents this locking tendency from interfering with the proper starting of the motor. The starting torque represented in the curve of Fig. 9 is an average value for all positions of the rotor. In no stationary rotor position is the locking tendency sufficient to overcome the induction motor starting torque so as to prevent the motor from starting.

It will also be evident that in order to provide a practicable self starting synchronous motor operating on this principle, it is essential that the rate of shift of the flux through the air gap in the direction of the rotor movement must be in excess of the speed of the disc at which the synchronizing action takes place, as otherwise, the induction motor action would not be able to bring the rotor up to the synchronous speed. In other words, the synchronizing action must take place at a speed below that corresponding to the full induction motor speed.

The adjustable shading coil 13 permits of some adjustment between the relative values of the induction and reaction motor torques since this adjustment varies the rate of flux shift in the direction of rotation of the disk. Where the motor is always intended to run at a synchronous speed in normal operation at a known lead this adjustment may be made in the factory before shipment, in which case the worm and screw adjusting means will not be necessary. The reaction and induction motor torques may be so proportioned with respect to the load that for one adjustment the motor will run in synchronism and then by increasing the induction motor torque by the shading coil adjusting means the motor speed may be carried above synchronism. Where the load is variable the adjustment may be such that the motor will operate at a synchronous speed at heavy loads and at a higher speed at light loads.

In order to give one practical set of dimensions for the novel parts of the motor, but not to limit the invention, I have found that a motor having the relative dimensions and arrangements shown in Figs. 1 and 2 designed for use as a timing motor in demand meters on a 220 volt 60 cycle circuit may have an aluminum disc of a diameter of 1⅝" containing 30 evenly spaced soft iron pins each 30 mils in diameter and 10 mils long corresponding to the thickness of the disc. An air gap of .05 inches is satisfactory for such a motor.

It will be evident to those skilled in the art that which with a given field structure, the synchronous speed of the motor may be changed by substituting discs of different diameters and numbers of pins. For example, if I substituted for the disc 18 in Figs. 1 and 2, a disc having half the diameter and 15 evenly spaced pins, spaced apart the same distance as before and move the axis of rotation of this smaller disc toward the field so as to bring the pins within the air gap, the motor will have a synchronous speed of 480 R. P. M. The peripheral speed of the disc through the air gap will be exactly the same as before and the conditions represented in Figs. 3 to 8 will apply. The invention is by no means limited to having three pins in the air gap of a field structure such as represented, nor to having the particular kind of a flux shifting arrangement herein shown.

It will of course be evident that the armature member herein represented as a disc might be in any other desired shape so long as it is arranged to move in a relatively narrow air gap and to be cut by a shifting flux threading such air gap and where a disc is mentioned I intend to include equivalent arrangements.

In accordance with the provisions of the patent statutes, I have described the principle of operation of my invention, together with the apparatus which I now consider to represent the best embodiment thereof, but I desire to have it understood that the apparatus shown and described is only illustrative and that the invention may be carried out by other means.

What I claim as new and desire to secure by Letters Patent of the United States, is,—

1. An alternating current motor having a disc rotor and a stationary field member for producing a shifting alternating flux through said disc, the disc rotor being provided with a plurality of polar magnetic sections of such size and spacing as to cooperate with the shifting flux pulsations of the stator to produce a predominating reaction motor torque at a definite synchronous speed below that corresponding to the maximum induction motor speed while permitting the starting of said disc by induction motor action.

2. An alternating current motor of the induction reaction type comprising a stationary field member having a narrow air gap and provided with means for producing a shifting alternating flux through said gap, an armature member of non-magnetic conducting material rotatably mounted in said air gap, said member being provided with a plurality of polar magnetic sections arranged to pass through said air gap in succession as the armature is rotated, the relative size and spacing of said polar sections being such as to produce a predominating reaction torque at a speed below that corresponding to the maximum induction motor speed while permitting the starting of said armature by induction motor action.

3. An alternating current motor of the induction reaction type having a stationary field member for producing a shifting alternating flux and an induction disc rotor member therefor having a plurality of magnetic pins extending therethrough evenly spaced about the axis of rotation so as to pass through the flux field as the disc is rotated, the number of said pins being such that they pass through the field in a synchronous relation with the flux alternations when the disc is rotated at a speed below that corresponding to the maximum induction motor speed, the synchronizing polar effect of said pins predominating over the induction motor effect at said speed.

4. A self starting synchronous motor of the induction reaction type having a stationary field member for producing a shifting alternating flux and an induction disc rotor member therefor having a plurality of small soft iron pins extending therethrough evenly spaced about the axis of rotation so as to pass through the flux field as the disc is rotated, the relative size and spacing of said pins being such as to produce a predominating reaction motor torque at a definite synchronous speed below that at which the induction motor torque becomes nil without preventing the starting of said disc by induction motor action.

5. A self starting synchronous motor of the induction reaction type comprising a shaded pole alternating current field member having a narrow air gap, an induction disc armature mounted to rotate in and to be cut by the flux threading said air gap, a plurality of small polar magnetic sections carried by said disc and evenly spaced about the axis of rotation so as to pass successively through said air gap as the armature is rotated, the peripheral dimension of said air gap with respect to the disc being such as to inclose an average of three of said polar sections at any instant, said polar sections being of such dimensions as to produce a predominating reaction motor torque at a speed below that corresponding to the maximum induction motor speed without preventing the starting of said disc by induction motor action.

6. A self starting synchronous motor of the induction reaction type comprising a shaded pole alternating current field magnet provided with an air gap, an aluminum disc armature rotatably mounted in said air gap, and a plurality of soft iron pins extending through said disc evenly spaced adjacent the periphery thereof, said pins having a diameter of approximately three times the thickness of the disc, the number of said pins being sufficient to establish a synchronous reaction relation with the shifting alternating flux at a speed below that at which the induction motor action becomes nil.

7. A self starting synchronous motor of the induction disc type having means for producing an induction motor starting torque and means for producing a predominating reaction motor synchronizing torque at a speed below that at which the induction motor torque becomes nil and means for adjusting the relative values of the induction motor and reaction motor torques at said speed.

In testimony whereof, I have hereunto set my hand this second day of February, 1925.

CHESTER I. HALL.

---

CERTIFICATE OF CORRECTION.

Patent No. 1,668,365.  Granted May 1, 1928, to

CHESTER I. HALL.

It is hereby certified that error appears in the printed specification of the above numbered patent requiring correction as follows: Page 3, line 27, strike out the word "which"; and that the said Letters Patent should be read with this correction therein that the same may conform to the record of the case in the Patent Office.

Signed and sealed this 10th day of July, A. D. 1928.

M. J. Moore,
Acting Commissioner of Patents.

(Seal)